Nov. 10, 1970          H. J. TYLER          3,539,872

ELECTRIC IGNITER CONTROL CIRCUITRY

Filed March 5, 1969

INVENTOR,
Hugh Jean Tyler
BY Chisten, Sabol & O'Brien
ATTORNEYS

United States Patent Office 3,539,872
Patented Nov. 10, 1970

3,539,872
ELECTRIC IGNITER CONTROL CIRCUITRY
Hugh Jean Tyler, Santa Ana, Calif., assignor to Robertshaw Controls Company, Richmond, Va., a corporation of Delaware
Filed Mar. 5, 1969, Ser. No. 804,634
Int. Cl. F23g 7/02
U.S. Cl. 317—79       10 Claims

ABSTRACT OF THE DISCLOSURE

Control circuitry for electric igniters including a transformer for providing proper electrical power to an electric igniter and control system circuitry and components, the transformer being arranged to permit the control system circuitry and components to be operated at a first voltage level and a first current level and the electric igniter to be operated at a second voltage level lower than the first voltage level and a second current level higher than the first current level.

BACKGROUND OF THE INVENTION

The present invention pertains to control circuitry for electric igniters and more particularly to control circuitry for providing proper operating voltage and current levels for electric igniters without adversely affecting operation of other components of temperature control systems.

Recently there have been great technological advances in the design and use of electric igniters with burners in temperature control systems; and, specifically, hot-wire igniters have been designed that avoid the disadvantages previously concomitant with hot-wire electric igniters. These electric igniters generally require electricity having voltage levels of from 2 to 5 volts and a current level of from 3 to 7 amperes in order to operate at maximum efficiency.

Control circuitry and components of temperature control systems in which the electric igniters are used are generally operated with electricity having a voltage level of approximately 24 volts and a current level of approximately .66 amperes, and it has been found that electricity at these levels is best suited for such components. For instance, this voltage level permits cleaning of the contacts of a thermostatic switch, and this current level is utilized in most thermostatic switches to operate anticipators which rely on current flow for proper operation. Such anticipators are utilized in anticipating a final room temperature to avoid overshooting the desired room temperature by a heating system. Anticipation is provided by permitting the current to flow through the anticipator in a room thermostat to generate heat which effects the thermostat and causes it to open prematurely whereby the heat from the heating system supplied after opening of the thermostat brings the room temperature to the desired or set temperature.

The integrating of electric igniters into conventional temperature control circuitry and components presents the problem that the electricity levels or power for proper operation of the igniters and the components vary to the extent of providing detrimental operation of either the igniter or the components depending upon the electricity levels utilized. Normally a thermostatic switch controls the operation of the electric igniter, and thus the simplest manner in which to provide accurate igniter control is to connect the thermostatic switch in series with the igniter. However, due to the different electricity levels required, this is no longer desirable. For instance, if a conventional thermostat is operated with electricity of from 2 to 7 amperes and 2 to 5 volts the relatively high current that must be carried by the contacts of the thermostat will burn the thermostat contacts and cause early replacement thereof. Another problem is that the relatively high current carried by the thermostat will produce far too much heat from the anticipator thereby causing the entire system to be inefficient.

Another difficulty that must be overcome in utilizing electric igniters with temperature control circuitry and components is that low voltage relays are expensive and therefore to operate cooling apparatus from the voltage level required for an electric igniter is undesirable. Furthermore, most conventional components of temperature control systems, such as solenoid valves, conventional relays and time delay relays, are designed to be operated with 24 volts, thereby requiring design changes in components for use with electric igniters in systems to be installed and changes in components in existing systems in which electric igniters are desired.

Thus it can be seen that many problems must be overcome in order to combine electric igniters with conventional temperature controlling circuitry and components in new installations as well as the many problems that must be overcome in the up-dating of existing systems when providing them with the advantages of electric igniters.

SUMMARY OF THE INVENTION

Accordingly it is an object of the present invention to utilize control circuitry with an electric igniter and temperature control system circuitry and components to provide proper electrical power for both.

A further object of the present invention is to utilize a thermostatic switch to control the operation of an electric igniter while providing proper voltage and current levels for both the thermostatic switch and the electric igniter.

Another object of the present invention is to utilize a transformer to permit a conventional thermostat to be operated with proper voltage and current levels while providing a current level higher than the current level required by the thermostat and a voltage level lower than the voltage level required by the thermostat for an electric igniter.

The present invention has another object in that a transformer is utilized in a temperature control system to permit a thermostat and cooling apparatus to operate with the required electrical voltage and current levels while operating an electric igniter at its required voltage and current levels.

Some of the advantages of the present invention are that an electric igniter may be utilized with a conventional thermostatic switch without sacrificing efficiency or operating effectiveness and that cooling apparatus may be efficiently controlled by a conventional thermostatic switch without the inclusion of a low voltage relay while incorporating an electric igniter into the circuitry.

The present invention is generally characterized in electric ignition control circuitry including a first circuit having a thermostatic switch operable at a first voltage level and a first current level, a second circuit having an electric igniter operable at a second voltage level and a second current level, and transformer means connected with the first and second circuits to provide the thermostatic switch and the electric igniter with proper electrical power.

Further objects and advantages of the present invention will become apparent from the description of the preferred embodiments as shown in the accompanying drawings.

DESCRIPTION OF THE PREFERRED EMBODIMENTS

The present invention is described with respect to temperature control systems; however, it is clear that the application of the present invention pertains to the use of electric igniters for igniting fuel at burners under the control of conventional control components.

Figure 1:
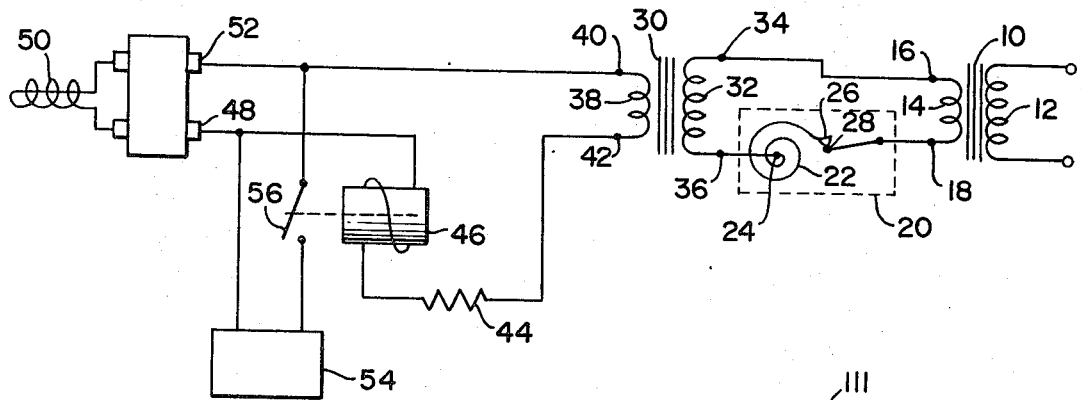
FIG. 1 is a schematic diagram of a first embodiment of electric igniter control circuitry according to the present invention.

A first embodiment of the present invention is illustrated in FIG. 1 and includes a step down transformer 10 having a primary winding 12 adapted to be connected to a conventional source of electricity such as 115 volts, 60 Hz. A.C. Transformer 10 includes a secondary winding 14 having a turn ratio with respect to primary winding 12 to provide a 24 volt, .66 ampere output across its terminals 16 and 18. The current provided by transformer 10 may vary from .2 to 1 ampere; however, the voltage will remain substantially constant.

Terminal 18 of secondary winding 14 is connected with a thermostat, generally indicated at 20, including a spiral bimetal 22 having a stationary end 24 and a movable contact 26 attached to a free end and disposed above a stationary contact 28. Thermostat 20 is shown schematically and it is clear that any conventional thermostat may be utilized with the present invention. For instance, heat generated by the current passing through bimetal 22 may anticipate temperature or an anticipator may be connected in series with contacts 26 and 28 in order to provide temperature anticipation. Of course, any type of temperature responsive means may be utilized to cause closure and opening of contacts 26 and 28 and the invention is not limited to thermostats having spiral bimetals.

A step down transformer 30 has a primary winding 32 having terminals 34 and 36, and terminal 16 of secondary winding 14 is connected directly to terminal winding 34 of primary winding 32. Terminal 36 of primary winding 32 is connected to stationary end 24 of bimetal 22 and thus is connected through thermostat 20 to terminal 18 of second winding 18. Transformer 30 has a secondary winding 38 having terminals 40 and 42 and the turns ratio of primary winding 32 to secondary winding 38 is approximately 6:1 in order to provide a voltage across terminals 40 and 42 of approximately 4 volts and a current of approximately 4 amperes. A resistor 44 having a positive temperature coefficient of resistance and a relay 46 are connected in series between terminal 42 and a terminal 48 of an electric igniter 50 of the Kanthal or glow-wire type. Igniter 50 is connected directly to terminal 40 of secondary winding 38 at a second terminal 52.

An electrically controlled valve 54 is connected in parallel with igniter 50 across secondary winding 38 through a switch 56 under the control of relay 46. Valve 54 has a very high resistance thereby requiring very little current for operation and, consequently, permitting sufficient current to be supplied to igniter 50 to permit proper operation thereof.

The present invention is based on the similar power requirements of electric igniters and conventional components and circuitry of thermostatic control systems. For instance, the power required for proper operation of thermostat 20 is determined by multiplying voltage times current and thus can be seen to be approximately 16 watts. The power required by igniter 50 may be determined in the same manner and will be seen to be anywhere from 6 to 35 watts. Normally, as previously set forth, the 4 amperes and 4 volts supplied by transformer 30 will provide 16 watts of power, and the electric igniter may be operated directly across secondary winding 38 without resistor 44, relay 46 or valve 54. Thus, the addition of transformer 30 provides the unexpected and greatly advantageous result of transforming voltage and current levels to provide proper voltage and current levels for both electric igniters and the circuitry and components of temperature control systems.

In operation, valve 54 may control the flow of fuel to a burner, not shown, which is ignited by the energization of electric igniter 50. The operation will be explained with respect to heating systems having a furnace of which the burner is a part to heat a given space; however, it is clear that the invention could be used in a cooling system using the burner or any other system in which an electric igniter may be employed. Thermostat 20 is disposed so as to sense the temperature in the space and bimetal 22 is arranged so as to deflect in a clockwise direction with decreasing temperature and in a counterclockwise direction with increasing temperature. When the temperature of the space drops below the set temperature, bimetal 22 will deflect clockwise to close contacts 26 and 28 and complete a circuit between secondary winding 14 of transformer 10 and primary winding 32 of transformer 30. As previously mentioned, the voltage and current levels supplied to thermostat 20 due to step-down transformer 10 are approximately 24 volts and .66 ampere, and thus thermostat 20 is operated with proper electricity. Similarly, step-down transformer 30 transforms the electricity supplied to primary winding 32 from approximately 24 volts and .66 ampere to approximately 4 volts and 4 amperes, and this electricity is applied to igniter 50 and valve 54 through resistor 44 and relay 46. The voltage drop across relay 46 and resistor 44 may be designed for any specific igniter and for example, may be 2 volts if the remaining 2 volts is sufficient for proper operation of igniter 50. Due to the high resistance of valve 54, the current flowing therethrough is minimal and most of the current supplied by secondary winding 38 flows through igniter 50.

Thus, when the contacts of thermostat 20 close, proper electricity is applied to igniter 50 to energize the igniter and relay 46 is similarly energized to close switch 56 and open valve 54 to supply fuel to the burner to be ignited by igniter 50. When the temperature in the space approaches the set temperature, thermostat 20 will open to stop the supply of electricity to transformer 30 and thereby de-energize relay 46 and igniter 50 to close valve 54 and shut down the system.

If during heating operation of the system a rupture should occur in igniter 50, the voltage drop across valve 54 will increase to the extent that sufficient voltage is not available to maintain relay 46 in an energized state and the relay will drop out opening switch 56 to close valve 54 and prevent the dangerous conditions existing when valve 54 is opened with no igniting temperature at the burner. Similarly, if a short occurs across igniter 50, the voltage drop across resistor 44 will increase thereby subtracting voltage from the voltage available to operate valve 54; the resistor 44 acts to limit current to the igniter 50 if the supply voltage is high. Thus, it may be seen that the valve operated in cooperation with electric igniter 50 is specifically adapted to be combined in circuit with the igniter to provide fail-safe operation.

The unique relationship between the power required by conventional temperature control system components such as thermostat 20 and the power required by electric igniter 50 permits the use of a transformer 30 to provide proper electrical power for operation of both, and resistor 44, relay 46 and valve 54 have been shown in combination with igniter 50 in order to illustrate a fail-safe system according to the present invention with the realization that igniter 50 could be connected directly across secondary winding 38 of transformer 30 to operate on the 16 watts of power available therefrom.

Figure 2:
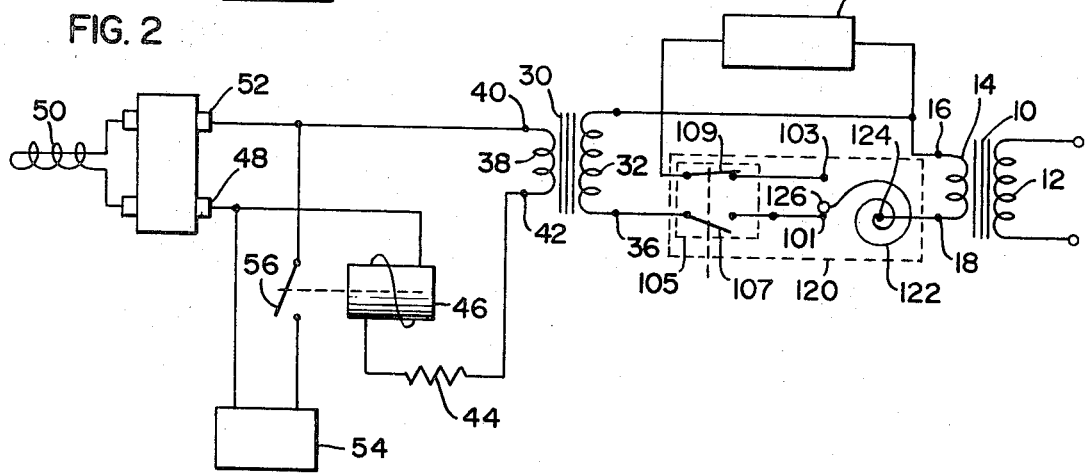
FIG. 2 is a schematic diagram of a modification of the electric igniter control circuitry of FIG. 1 for use with heating and cooling thermostats.

A modification of the electric igniter control circuitry of FIG. 1 is illustrated in FIG. 2 and parts identical to parts shown in FIG. 1 are given identical reference numerals and will not be described again. Parts similar to parts illustrated in FIG. 1 are given reference numerals with 100 added.

A thermostat 120 is connected between terminal 36 of primary winding 32 of transformer 30 and terminal 18 of secondary winding 14 of transformer 10 and includes a spiral bimetal 122 having a stationary end 124 and a free end carrying a contact 126. A pair of stationary contacts 101 and 103 are disposed on either side of contact 126 in order to permit thermostat 120 to operate as both a heating and cooling thermostat under the control of a switch 105 having a pair of ganged switch blades 107 and 109. Bimetal 122 is arranged so that it rotates counterclockwise with decreasing temperature and clockwise with increasing temperature thereby permitting closure of contacts 126 and 101 to indicate that the temperature sensed is below the set temperature and closure of contacts 127 and 129 to indicate that the temperature sensed is above the set temperature. Accordingly, contacts 101 and 103 are utilized for heating and cooling, respectively. Closure of contacts 101 and 126 complete a circuit through primary winding 32 of transformer 30 to thereby energize igniter 50 and open valve 54 which may be associated with a furnace to provide heating of the space. Contact 103 is connected through blade 109 to conventional cooling apparatus 111, and if cooling apparatus is utilized that requires an electric igniter blade 109 may be connected to a transformer similar to transformer 30 to energize the electric igniter with proper electricity as described in FIG. 1.

In operation, when switch 105 is set for cooling operation, as illustrated in FIG. 2, with blade 109 connected with contact 103, if the temperature sensed by thermostat 120 rises above the set temperature spiral bimetal 122 will rotate clockwise to close contacts 126 and 103 and energize cooling apparatus 111 to provide the proper cooling effect. Once the temperature has been decreased to the set temperature, contacts 126 and 103 will open and the cooling apparatus will be deenergized.

When switch 105 is moved to cause blade 107 to connect with contact 101, thermostat 120 will be utilized for heating, and the system will operate in the same manner as previously described with respect to FIG. 1. That is, igniter 50 will be energized and valve 54 will be opened when electricity is supplied to transformer 30 by closure of contacts 126 and 101 in response to the space temperature dropping below the set temperature. When the space temperature has been sufficiently raised by the heating system of which igniter 50 is a part, contacts 126 and 101 will open to deenergize the system.

Thus, the present invention permits the use of conventional cooling apparatus requiring conventional electrical power while also providing proper electrical power for operation of igniter 50.

Figure 3:
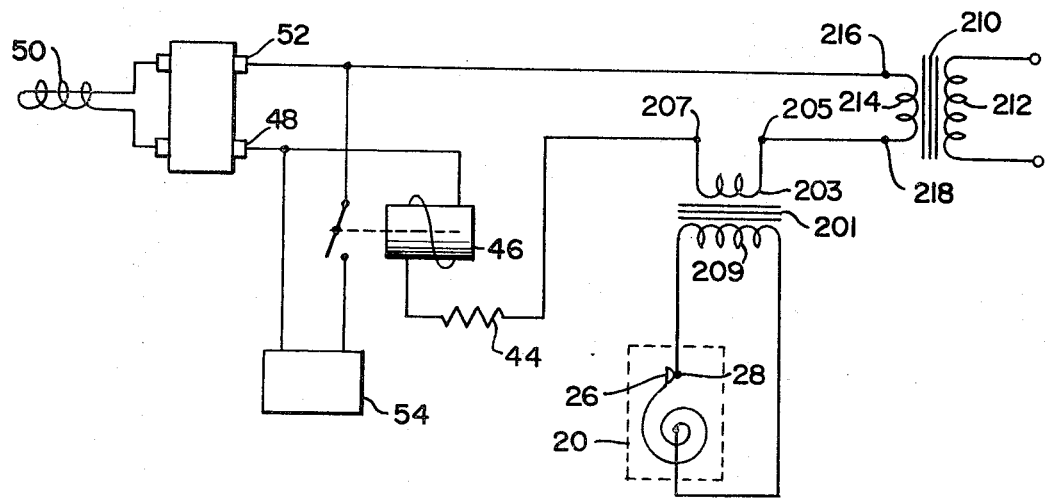
FIG. 3 is a schematic diagram of another embodiment of electric igniter control circuitry according to the present invention.

Another embodiment of the present invention is illustrated in FIG. 3 and parts identical to parts shown in FIG. 1 are given identical reference numerals and will not be described again. Parts similar to parts illustrated in FIG. 1 are given reference numerals with 200 added.

A step down transformer 210 has a primary winding 212 adapted to be connected to a conventional source of electricity such as 115 volt, 60 Hz. A.C. and a secondary winding 214 having terminals 216 and 218. The turns ratio of primary winding 212 to secondary winding 214 is relatively large to provide a voltage across terminals 216 and 218 of approximately 4 volts and a current of approximately 4 amperes. Terminal 216 is connected directly to the parallel combination of igniter 50 and valve 54 which cooperate with relay 46 and resistor 44 in the same manner as described with respect to FIG. 1.

A transformer 201 includes a primary winding 203 having a terminal 205 connected with terminal 218 of secondary winding 214 and a terminal 207 connected with the igniter circuitry at resistor 44. A secondary winding 209 of transformer 201 is connected directly across thermostat 20. The turns ratio of primary winding 203 to secondary winding 209 is approximately 1:6 to thereby provide proper operating electricity for thermostat 20; that is, 24 volts and .66 ampere.

The embodiment of FIG. 3 will be described in operation with respect to a heating system; and, accordingy, thermostat 20 will be open when the temperature sensed by the thermostat is higher than the set temperature. At this time the voltage across secondary winding 209 will be approximately 24 volts; however, the current will be zero due to the open circuit of thermostat 20. Thus, primary winding 203 will impose an extremely high impedance on the igniter circuit due to the extremely high impedance presented by open thermostat 20 to prevent sufficient energization voltage from being supplied to igniter 50. Effectively, when thermostat 20 is open primary winding 203 will act as an open switch to open the igniter circuit.

When the temperature sensed by thermostat 20 drops below the set temperature, contacts 26 and 28 will close to complete a circuit through secondary winding 209, and the voltage across secondary winding 209 will be approximately zero volts and the current will be approximately .66 ampere, thereby providing proper operation of thermostat 20. The extremely low resistance of thermostat 20 is reflected across transformer 201 such that primary winding 203 exhibits only a small resistance in the igniter circuit.

The small resistance of primary winding 203 permits the remainder of the igniter circuitry to operate as previously described with respect to FIG. 1; that is, igniter 50 will be energized and valve 54 will be open. When the heat demand is satisfied, thermostat 20 opens to deenergize the igniter circuit due to the high resistance presented by primary winding 203.

The present invention has been described with respect to heating and/or cooling systems; however, the present invention is concerned primarily with the supply of electricity at proper voltage and current levels to an electric igniter and conventional control system components to permit proper operation of both. Accordingly, the present invention is not limited to use in temperature control systems but may be utilized in any system requiring the use of electric igniters with a control system.

The components such as valve 54, relay 46 and resistor 44 of the igniter circuits of FIGS. 1, 2 and 3 may be varied in accordance with design considerations, and transformers 30 and 201 may be replaced with autotransformers if desired.

Inasmuch as the present inventiton is subject to many variations, modifications and changes in detail, it is intended that all matter described in the foregoing specification or shown in the accompanying drawings shall be interpreted as illustrative and not in a limiting sense.

What is claimed is:

1. Electric ignition control circuitry comprising
a first circuit including a thermostatic switch operable at a first voltage level and a first current level;
a second circuit including an electric igniter operable at a second voltage level and a second current level, the operation of said electric igniter being controlled by the state of said thermostatic switch; and
transformer means connected with said first circuit and said second circuit and adapted to be connected with a source of electricity to provide said thermostatic switch with said first voltage level and first current level and to provide said electric igniter with said second voltage level and said second current level.

2. The invention as recited in claim 1 wherein said transformer means includes a first transformer having a first primary winding adapted to be coupled with the source of electricity and a first secondary winding connected with said first circuit to provide said thermostatic switch means with said first voltage level and said first current level.

3. The invention as recited in claim 2 wherein said transformer means includes a second transformer having a second primary winding connected with said first circuit and a second secondary winding connected with said second circuit to provide said electric igniter with said second voltage level and said second current level, said first voltage level being greater than said second voltage level and said first current level being lower than said second current level.

4. The invention as recited in claim 3 wherein the turns ratio of said second primary winding to said second secondary winding is 6:1.

5. The invention as recited in claim 1 wherein said transformer means includes a transformer having a first winding connected with said first circuit and a second winding connected with said second circuit whereby said thermostatic switch is provided with said first voltage level and said first current level and said electric igniter is provided with said second voltage level and said second current level, said first voltage level being greater than said second voltage level and said first current level being lower than said second current level.

6. The invention as recited in claim 1 wherein said transformer means includes a first transformer having a first primary winding adapted to be coupled with the source of electricity and a first secondary winding connected with said second circuit, and a second transformer having a second primary winding connected with said second circuit and a second secondary winding connected with said first circuit whereby said thermostatic switch is provided with said first voltage level and said first current level and said electric igniter is provided with said second voltage level and said second current level, said first voltage level being greater than said second voltage level and said first current level being lower than said second current level.

7. The invention as recited in claim 6 wherein said second primary winding is connected in series with said electric igniter and the resistance of said second primary winding varies in accordance with the state of said thermostatic switch to control said electric igniter.

8. The invention as recited in claim 6 wherein said thermostatic switch is connected directly across said second secondary winding.

9. The invention as recited in claim 7 wherein the turns ratio of said second primary winding to said second secondary winding is 1:6.

10. The invention as recited in claim 1 wherein said thermostatic switch has a first contact for a first mode of operation and a second contact for a second mode of operation, and said transformer means includes a primary winding connected with said first contact for energizing said electric igniter when said thermostatic switch means is in said first mode of operation, and further including temperature control apparatus connected with said second contact for operation when said thermostatic switch is in said second mode of operation.

References Cited
UNITED STATES PATENTS

| | | | |
|---|---|---|---|
| 2,644,117 | 6/1953 | Schmitt et al. | 317—98 X |
| 2,799,809 | 7/1967 | Lautenberger | 317—79 |
| 3,393,038 | 7/1968 | Burkhalter et al. | 317—98 X |
| 3,457,020 | 7/1969 | Hine | 431—66 |

VOLODYMYR Y. MAYEWSKY, Primary Examiner

U.S. Cl. X.R.

219—265, 510; 431—66